L. E. WHITON.
CHUCK.
APPLICATION FILED SEPT. 28, 1907.
1,099,227.
Patented June 9, 1914.
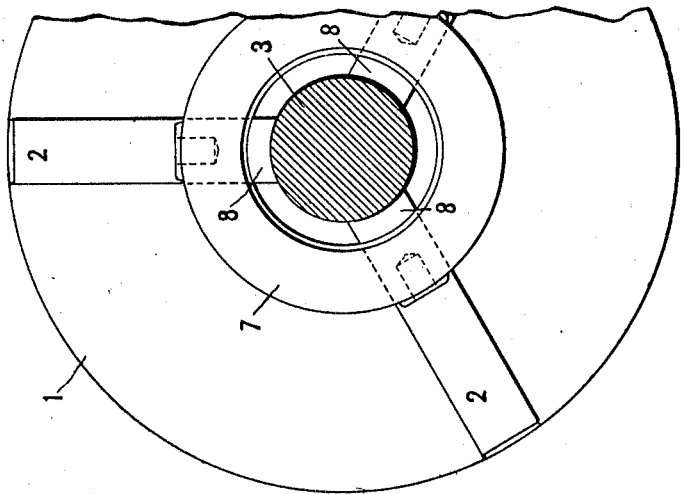
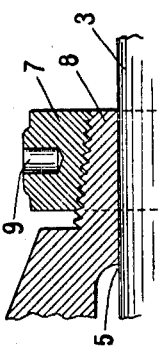
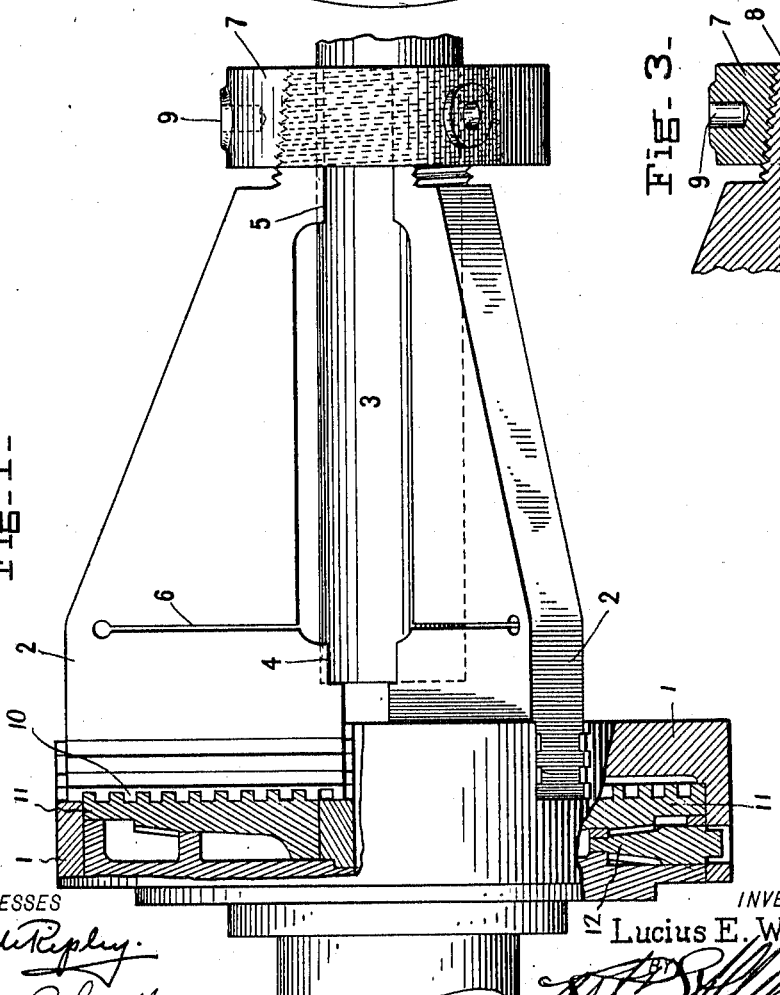
WITNESSES
INVENTOR
Lucius E. Whiton.
ATTORNEY

UNITED STATES PATENT OFFICE.

LUCIUS E. WHITON, OF NEW LONDON, CONNECTICUT.

CHUCK.

1,099,227. Specification of Letters Patent. Patented June 9, 1914.

Application filed September 28, 1907. Serial No. 394,959.

*To all whom it may concern:*

Be it known that I, LUCIUS E. WHITON, a citizen of the United States, residing at New London, in the county of New London and State of Connecticut, have invented certain new and useful Improvements in Chucks, of which the following is a specification.

My invention relates to improvements in chucks particularly for holding work to be bored.

One of the objects is to secure an effective centering action.

Another object is to hold long pieces of work and center both ends simultaneously.

Another object is to allow for slight irregularities in the stock and yet obtain good centering.

These objects are attained by the use of special jaws adjustable in the ordinary manner and having spring like, yielding extensions which are clamped by an adjusting nut or collar.

Figure 1 is a side view of a chuck embodying the invention, parts being broken away to expose the means for shifting the jaws simultaneously. Fig. 2, is a fragmentary face view of the same. Fig. 3, is a detail sectional view of the end of a jaw and the clamping nut.

The invention is particularly directed toward universal jawed chucks of the type shown for instance in my former Patent #551,426, Dec. 17, 1895, and is so illustrated. The body 1 carries a plurality of jaws such as 2, 2, 2, which are simultaneously adjustable as is common in this type of chuck for the purpose of gripping the work, such as 3. Each jaw has a gripping surface 4 adjacent the chuck body, and an extension with a gripping surface 5 remote from the body. The jaw is preferably made from a bar of metal which after the surfaces are finished, is cut through along the line 6, so as to leave the extension more or less elastic or flexible. In this way both ends of the jaws can seat properly even if the work is slightly irregular. After centering as above described, I put a further pressure upon the ends of the jaws by means of a nut 7, which is interiorly provided with a tapered screw thread corresponding with the segemental threads on the ends 8, 8, 8 of the jaw extensions. In the drawing, the nut is shown as provided with recesses or sockets such as 9, for engagement by a spanner wrench. By turning the nut 7, the ends of the jaws may be tightened or loosened as desired.

In this construction the inner ends of all the jaws being of the universal type, are simultaneously adjustable, the base of each jaw being shown provided with teeth 10 meshing with the rotary scroll plate 11, whereby all the jaws may be simultaneously moved in or out as the scroll plate is rotated by means of the bevel pinion 12. The outer ends are also simultaneously adjustable, but independently of the inner ends since the outer ends of the jaws are movable independently of the inner ends.

What I claim is:

1. In a chuck, a body, a plurality of jaws adjustably carried thereby having gripping surfaces at their inner ends and provided with yielding extensions having gripping surfaces to engage at a more remote point the object held by the gripping surfaces at the inner ends of the jaws, means for bodily adjusting the jaws to carry the gripping surfaces at the inner ends of the jaws into and out of clamping engagement with the object to be held, and means independent of said adjusting means for simultaneously adjusting the yielding extensions of the jaws in respect to the object.

2. In a chuck, a body, a plurality of radially movable jaws carried thereby and having longitudinal extensions, means for adjusting said jaws simultaneously and means operable independently of said adjusting means for clamping all the extensions simultaneously.

3. In a chuck, a body, a plurality of radially movable jaws carried thereby and having longitudinal extensions, means for adjusting said jaws simultaneously and a rotatable collar for clamping all the extensions simultaneously and independently of said adjusting means.

4. In a chuck, a body, three coöperating jaws carried thereby spaced uniformly and radially adjustable on said body, each of said jaws having a gripping surface at its inner end and an extension provided with a gripping surface remote from the first gripping surface of the jaw, means for simultaneously adjusting the three jaws inwardly to thereby center the work in the chuck, and means independent of said adjusting means for simultaneously clamping the extensions upon the work so centered by the jaws.

5. As an article of manufacture, a lathe chuck jaw formed of an integral piece of metal and comprising a base portion 2 adapted to be adjusted in the body of a chuck and having a gripping face 4 and an extension having a gripping face 5, said jaw having a slot 6 separating the base portion from a part of the extension, the extension being connected to the base portion at the outer edge whereby the extension has a limited yielding movement relative to the base portion.

In testimony whereof I affix my signature in presence of two witnesses.

LUCIUS E. WHITON.

Witnesses:
L. G. STEBBINS,
J. H. GUMBLE.

Copies of this patent may be obtained for five cents each, by addressing the "Commissioner of Patents, Washington, D. C."